United States Patent
Chou et al.

(10) Patent No.: US 11,811,215 B2
(45) Date of Patent: Nov. 7, 2023

(54) COMPOUND CONTROL CIRCUIT

(71) Applicant: SEA SONIC ELECTRONICS CO., LTD., Taipei (TW)

(72) Inventors: Sheng-Chien Chou, Taipei (TW); Chih-Sheng Chang, Taipei (TW)

(73) Assignee: SEA SONIC ELECTRONICS CO., LTD., Taipei (TW)

( * ) Notice: Subject to any disclaimer, the term of this patent is extended or adjusted under 35 U.S.C. 154(b) by 0 days.

(21) Appl. No.: 17/403,441

(22) Filed: Aug. 16, 2021

(65) Prior Publication Data

US 2023/0047476 A1 Feb. 16, 2023

(51) Int. Cl.
| | | |
|---|---|---|
| *H02H 3/08* | (2006.01) | |
| *H02H 9/02* | (2006.01) | |
| *H02M 3/00* | (2006.01) | |
| *H02H 1/00* | (2006.01) | |

(52) U.S. Cl.
CPC ............ *H02H 3/08* (2013.01); *H02H 1/0007* (2013.01); *H02M 3/01* (2021.05)

(58) Field of Classification Search
CPC .............................. H02H 3/08; H02H 1/0007
USPC ....................................................... 361/93.1
See application file for complete search history.

(56) References Cited

U.S. PATENT DOCUMENTS

| | | | | |
|---|---|---|---|---|
| 4,876,622 | A * | 10/1989 | Dougherty | H02H 3/021 340/661 |
| 5,097,191 | A * | 3/1992 | Bahn | H02P 25/089 318/701 |
| 2008/0174922 | A1* | 7/2008 | Kimbrough | H02H 3/16 361/42 |
| 2014/0177112 | A1* | 6/2014 | Park | H02M 1/0038 361/56 |

* cited by examiner

*Primary Examiner* — Jared Fureman
*Assistant Examiner* — Lucy M Thomas
(74) *Attorney, Agent, or Firm* — Muncy, Geissler, Olds & Lowe

(57) ABSTRACT

A compound control circuit comprises an input end, a light-load signal processing circuit, a slow response circuit and a fast response circuit. The compound control circuit is mainly used as an additional circuit of a work control chip, so that although the work control chip only has a single overcurrent protection level, a compound function control of fast and slow speed, high and low level current protection and light-load signal stabilization can be generated through the compound control circuit, so as to meet the complex application environment and compatible requirements of the current power supply.

7 Claims, 4 Drawing Sheets

COMPOUND CONTROL CIRCUIT

FIELD OF THE INVENTION

The invention relates to an additional circuit connected with a work control chip for use, in particular to a compound control circuit which enables a work control chip with only a single overcurrent protection level to have multiple response modes.

BACKGROUND OF THE INVENTION

In order to ensure the control of the power conversion circuit to be stable, a work control chip for controlling the power conversion circuit of prior art generally has an overcurrent protection mechanism, and the work of the power conversion circuit is ensured through the overcurrent protection mechanism. However, the overcurrent protection mechanism only uses a single level to decide whether to start protection or not, which cannot meet application or compatibility requirements for the complex power conversion circuit working environment nowadays.

In addition, some work control chips are provided with an energy-saving working mode, and whether the power conversion circuit works in the energy-saving working mode or not is determined through an energy-saving level. However, when the power conversion circuit is in a light-load state, the electric signal feedback obtained by the work control chip is unstable and therefore the work control chip cannot accurately control the power conversion circuit.

SUMMARY OF THE INVENTION

The main purpose of the invention is to solve the problem that an implementation of judging whether protection is carried out only by a single current protection level of a conventional work control chip does not meet the requirements of complex and compatible power supply application environments at present.

The invention further aims to solve the problem that the work control chip with the energy-saving control mode cannot stably control the controlled circuit, due to the fact that the conventional work control chip with the energy-saving control mode cannot obtain stable feedback of electric signals when the controlled circuit is in light-load working.

In order to achieve the goal, the invention provides a compound control circuit connected with a current detection port of a work control chip, the work control chip comparing a first electric signal received by the current detection port with an overcurrent protection level, the compound control circuit comprising an input end, a light-load signal processing circuit, a slow response circuit, and a fast response circuit. The input end is connected with a detection point to obtain a second electric signal, the light-load signal processing circuit is connected with the input end and receives the second electric signal, the light-load signal processing circuit outputs a third electric signal based on a signal processing mechanism, the signal processing mechanism comprises two signal transition thresholds, and a potential of the third electric signal is determined based on the second electric signal and the two signal transition thresholds. The slow response circuit receives the second electric signal and the third electric signal from the input end and the light-load signal processing circuit, the slow response circuit stores energy with the second electric signal and the third electric signal, and if the energy stored by the slow response circuit reaches a first response threshold, the first electric signal with a potential corresponding to the overcurrent protection level is provided to the current detection port. The fast response circuit receives the second electric signal and the third electric signal from the input end and the light-load signal processing circuit, and if a potential of the second electric signal and the potential of the third electric signal are accumulated to reach a second respond threshold, the first electric signal is provided with the potential corresponding to the overcurrent protection level to the current detection port quickly.

In one embodiment, the compound control circuit comprises a first diode disposed at the input, the slow response circuit, and the fast response circuit.

In one embodiment, the compound control circuit comprises a first capacitor connected with the slow response circuit, the fast response circuit and the current detection port.

In one embodiment, the slow response circuit comprises a second capacitor and a first resistor forming a first node with the second capacitor, the first node is connected with the first diode and the light-load signal processing circuit, the first node receives the second electric signal transmitted by the first diode and the third electric signal output by the light-load signal processing circuit, a negative electrode of the second capacitor is grounded, and one end, which is not connected with the second capacitor, of the first resistor is connected with the current detection port.

In one embodiment, the fast response circuit comprises a second resistor, a third resistor connected in series with the second resistor and forming a second node, and a second diode connected with the third resistor, an anode of the second diode is connected with the second node, a cathode is connected with the current detection port, the second resistor is connected with the first diode and the light-load signal processing circuit, and the second resistor receives the second electric signal transmitted by the first diode and the third electric signal output by the light-load signal processing circuit.

In one embodiment, the light-load signal processing circuit comprises a fourth resistor, a third capacitor connected in series with the fourth resistor and forming a third node, a comparator, a third diode connected with the comparator, the slow response circuit and the fast response circuit, a fourth diode connected with the third diode and the comparator, and a fifth resistor connected with the fourth diode and the third node, the comparator is provided with a positive phase input end connected with the third node, a negative phase input end connected with a reference voltage source, and an output end which forms a fourth node with the third diode and the fourth diode, the anode of the third diode is connected with the fourth node, and the anode of the fourth diode is connected with the fourth node.

In one embodiment, the light-load signal processing circuit comprises a sixth resistor, a fourth capacitor connected in series with the sixth resistor and forming a fifth node, a voltage stabilizing triode, a working voltage source, a seventh resistor connected with the working voltage source and the voltage stabilizing triode, a metal oxide semiconductor field effect transistor, an eighth resistor connected with the voltage stabilizing triode, a ninth resistor connected in series with the eighth resistor and forming a sixth node, a fifth diode connected with the slow response circuit and the fast response circuit, a sixth diode connected with the fifth diode and forming a seventh node, a tenth resistor connected in series with the sixth diode and connected with the fifth node, and an eleventh resistor connected with the working voltage source and the seventh node, a gate of the metal oxide semiconductor field effect transistor is connected with the sixth node, a drain of the metal oxide semiconductor field effect transistor is connected with the seventh node, an anode of the fifth diode is connected with the seventh node, an anode of the sixth diode is connected with the seventh node, and the voltage stabilizing triode is connected with the seventh resistor and the eighth resistor to form an eighth node.

In one embodiment, the work control chip controls a circuit comprising essentially of two inductors and a capacitor (an LLC circuit).

Through the embodiments of the invention, compared with prior art, the invention has the following characteristics: according to the compound control circuit described, through the difference of the response time and the trigger action level of the fast response circuit and the slow response circuit, the work control chip only has a single trigger state, but various control thresholds can be derived. In addition, the light-load signal processing circuit of the invention is used for processing the second electric signal generated when the controlled circuit is in a light-load state, so that the error control of the work control chip caused by the oscillation when the second electric signal is in the light-load state can be avoided.

DETAILED DESCRIPTION OF THE PREFERRED EMBODIMENTS

Figure 1:
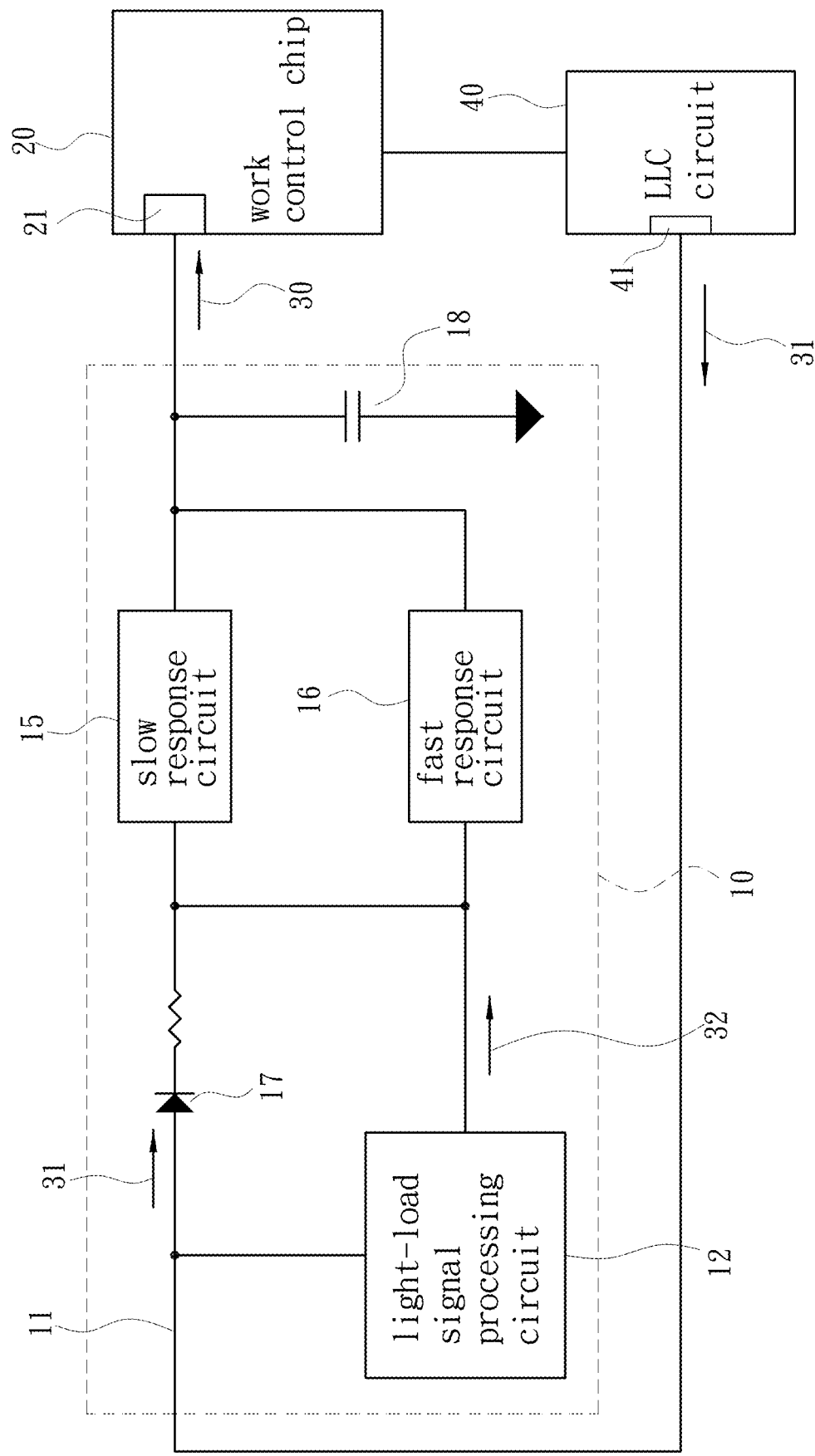
FIG. 1 is a schematic diagram of the implementation of the compound control circuit of the invention.

The detailed description and technical contents of the invention will now be described with reference to the drawings as follows:

With reference to FIG. 1, the invention provides a compound control circuit 10, primarily as an add-on circuit to a work control chip 20, which may be an LLC circuit work control chip, the work control chip 20 having a current detection port 21 connected with the compound control circuit 10, the work control chip 20 comparing a first electric signal 30 received by the current detection port 21 with an overcurrent protection level. When a level of the first electric signal 30 reaches a level specified by the overcurrent protection level, the work control chip 20 will perform an associated control of the controlled circuit 40 (e.g., LLC circuit) with a protection mechanism.

Figure 2:
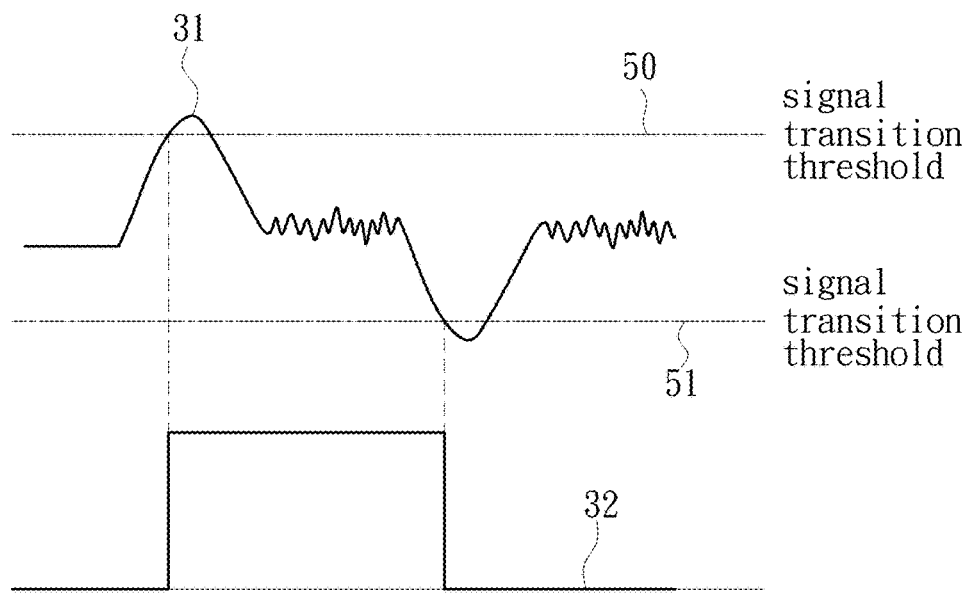
FIG. 2 is a schematic signal waveform diagram of a second electric signal generated when the controlled circuit is in a light-load state and subjected to signal processing by the light-load signal processing circuit.

The compound control circuit 10 is connected with the current detection port 21 of the work control chip 20 and comprises an input end 11, a light-load signal processing circuit 12, a slow response circuit 15 and a fast response circuit 16. The input end 11 is connected with a detection point 41 to obtain a second electric signal 31. Again with reference to FIG. 1 and FIG. 2, the light-load signal processing circuit 12 is connected with the input end 11 and receives the second electric signal 31, and the light-load signal processing circuit 12 enables the second electric signal 31 generated when the controlled circuit 40 is in a light-load state to be transferred to a subsequent electric component in a more stable manner. The light-load signal processing circuit 12 outputs a third electric signal 32 based on a signal processing mechanism, the signal processing mechanism comprises two signal transition thresholds, and a potential of the third electric signal 32 is determined based on the second electric signal 31 and the two signal transition thresholds. Specifically, transition levels of the two signal transition thresholds are different (e.g., 50, 51 in FIG. 2), the transition level of one of the two signal transition thresholds is higher than that of the other of the two signal transition thresholds, the level of the second electric signal 31 received by the light-load signal processing circuit 12 corresponds to one of the two signal transition thresholds, and the third signal 32 will transition. Illustratively, the third electric signal 32 output by the light-load signal processing circuit 12, like a general digital signal, has only two conditions, a high potential condition (1 in the digital signal) and a low potential condition (0 in the digital signal). When the second electric signal 31 received by the light-load signal processing circuit 12 is higher than or equal to the high level of the transition levels of the two signal transition thresholds, the third electric signal 32 will be output at a high potential. When the second signal 31 received later by the light-load signal processing circuit 12 is lower than or equal to the lower level of the transition levels of the two signal transition thresholds, the third signal 32 will transition from the original high level to the low level. The third electric signal 32 does not transition again until the second electric signal 31 received by the light-load signal processing circuit 12 is again higher than or equal to the higher level of the transition levels of the two signal transition thresholds.

On the other hand, the slow response circuit 15 receives the second electric signal 31 and the third electric signal 32 from the input end 11 and the light-load signal processing circuit 12, and the slow response circuit 15 stores energy with the second electric signal 31 and the third electric signal 32. When the energy stored by the slow response circuit 15 reaches a first response threshold, the first electric signal 30 with the potential corresponding to the overcurrent protection level is provided to the current detection port 21, and the first response threshold can be an energy storage potential of the slow response circuit 15. In fact, the slow response circuit 15 of the invention still provides the first electric signal 30 to the current detection port 21 during storage, but the potential of the first electric signal 30 does not meet the overcurrent protection level.

Further, the fast reaction circuit 16 receives the second electric signal 31 and the third electric signal 32 from the input end 11 and the light-load signal processing circuit 12, and the fast reaction circuit 16 provides the first electric signal 30 with a potential coinciding with the overcurrent protection level quickly to the current detection port 21 when potentials of the second electric signal 31 and the third electric signal 32 are accumulated to a second response threshold. Further, the fast response circuit 16 is different from the slow response circuit 15 that the fast response circuit 16 directly reacts on the basis of the potential accumulation of the second electric signal 31 and the third electric signal 32, and the slow response circuit 15 reacts with the energy storage potential. The response times and the action levels of the two are different, so that only a single trigger state of the work control chip 20 originally exists but various control thresholds can be derived.

Again with reference to FIG. 1, the compound control circuit 10 includes a first diode 17 disposed between the input end 11, the slow response circuit 15 and the fast response circuit 16. In one embodiment, the compound control circuit 10 comprises a first capacitor 18 connected with the slow response circuit 15, the fast response circuit 16, and the current detection port 21.

Figure 3:
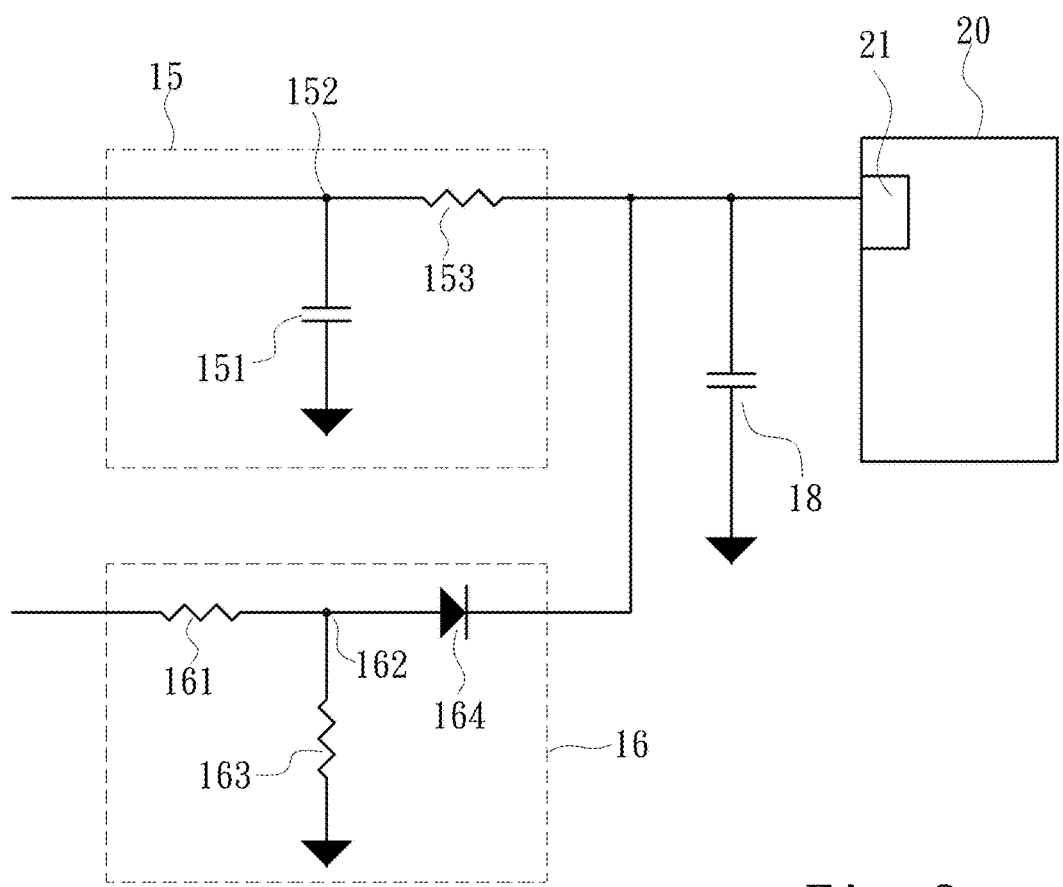
FIG. 3 is a schematic circuit diagram of a slow response circuit and a fast response circuit according to an embodiment of the invention.

Again with reference to FIG. 1 and FIG. 3, in one embodiment, the slow response circuit 15 comprises a second capacitor 151 and a first resistor 153 forming a first node 152 with the second capacitor 151, the first node 152 connected with the first diode 17 and the light-load signal processing circuit 12 and receiving the second electric signal 31 transmitted by the first diode 17 and the third electric signal 32 output by the light-load signal processing circuit 12, wherein a cathode of the second capacitor 151 is grounded, and one end, which is not connected with the second capacitor 151, of the first resistor 153 is connected with the current detection port 21. On the other hand, the fast response circuit 16 comprises a second resistor 161, a third resistor 163 connected in series with the second resistor 161 and forming a second node 162, and a second diode 164 connected with the third resistor 163, wherein an anode of the second diode 164 is connected with the second node 162, a cathode of the second diode 164 is connected with the current detection port 21, and the second resistor 161 is connected with the first diode 17 and the light-load signal processing circuit 12, and receives the second electric signal 31 transmitted by the first diode 17 and the third electric signal 32 output by the light-load signal processing circuit 12.

Figure 4:
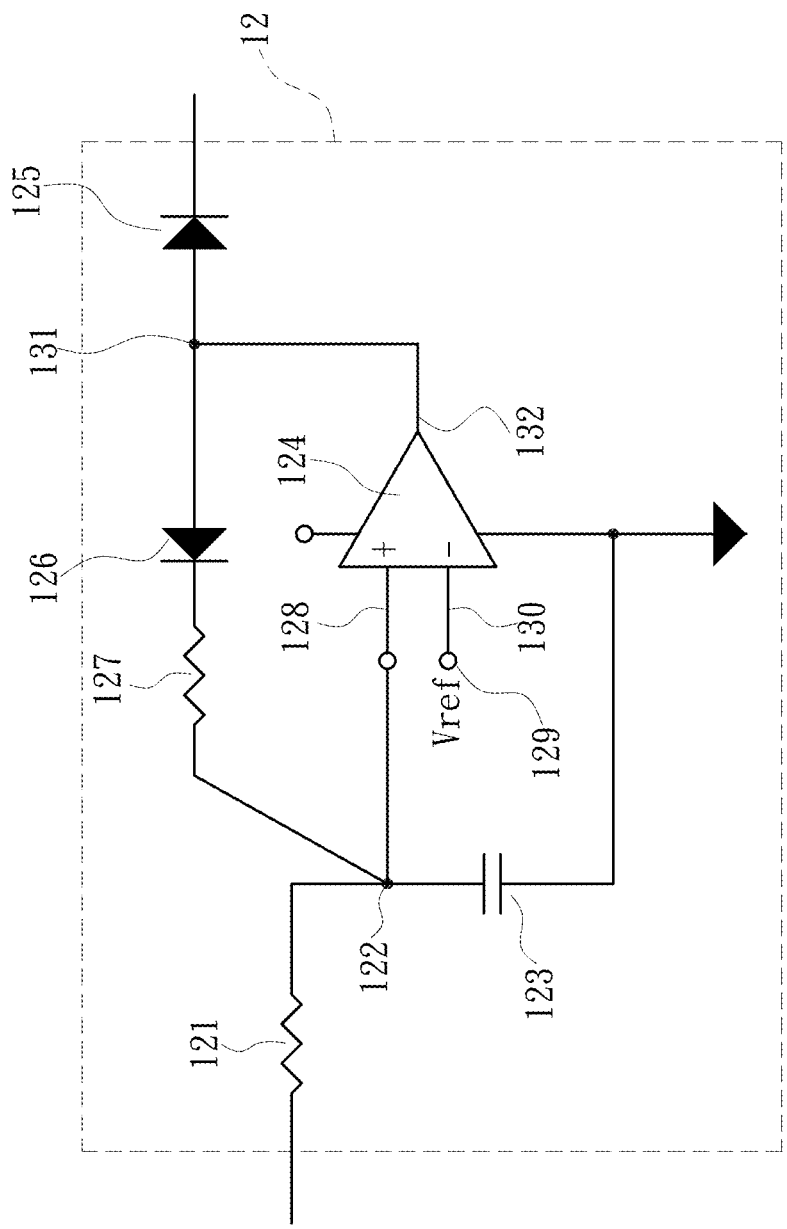
FIG. 4 is a schematic circuit diagram of a light-load signal processing circuit according to an embodiment of the invention.
Figure 5:
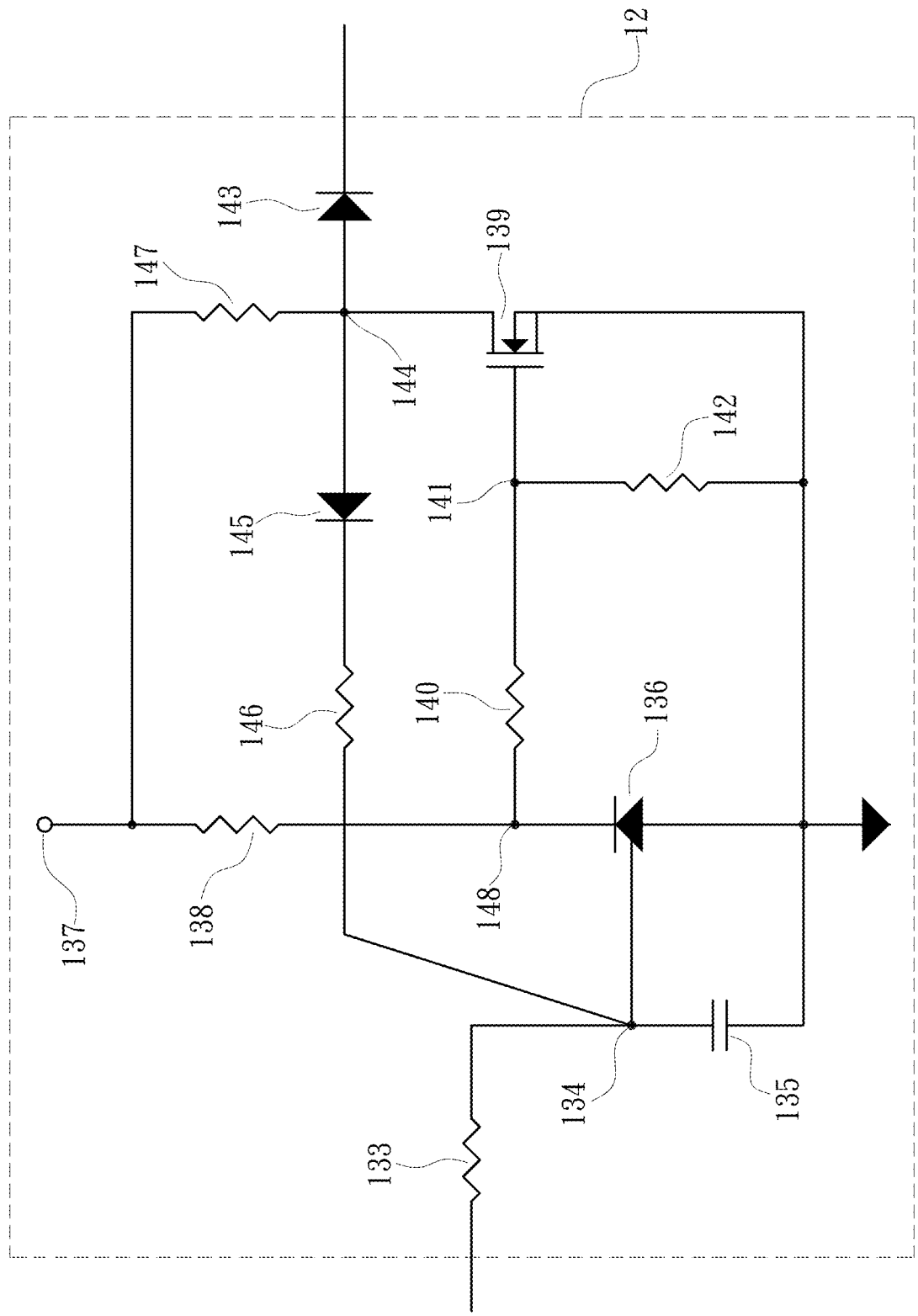
FIG. 5 is a schematic circuit diagram of a light-load signal processing circuit according to another embodiment of the invention.

Again with reference to FIG. 1 and FIG. 4, in one embodiment, the light-load signal processing circuit 12 comprises a fourth resistor 121, a third capacitor 123 connected in series with the fourth resistor 121 and forming a third node 122, a comparator 124, a third diode 125 connected with the comparator 124, the slow response circuit 15, and the fast response circuit 16, a fourth diode 126 connected with the third diode 125 to the comparator 124 and a fifth resistor 127 connected with the fourth diode 126 and the third node 122, wherein the comparator 124 has a positive phase input end 128 connected with the third node 122, a negative phase input end 130 connected with a reference voltage source 129, and an output end 132 forming a fourth node 131 with the third diode 125 and the fourth diode 126, an anode of the third diode 125 being connected with the fourth node 131, an anode of the fourth diode 126 being connected with the fourth node 131. In addition to the foregoing, with reference to FIG. 5, the light-load signal processing circuit 12, in another embodiment, comprises a sixth resistor 133, a fourth capacitor 135 connected in series with the sixth resistor 133 and forming a fifth node 134, a voltage stabilizing triode 136, a working voltage source 137, a seventh resistor 138 connected with the working voltage source 137 and the voltage stabilizing triode 13, a metal oxide semiconductor field effect transistor 139, an eighth resistor 140 connected with the voltage stabilizing triode 136, a ninth resistor 142 connected in series with the eighth resistor 140 and forming a sixth node 141, a fifth diode 143 connected with the slow response circuit 15 and the fast response circuit 16, a sixth diode 145 connected with the fifth diode 143 and forming a seventh node 144, a tenth resistor 146 connected in series with the sixth diode 145 and connected with the fifth node 134, and an eleventh resistor 147 connected with the working voltage source 137 and the seventh node 144, wherein a gate of the metal oxide semiconductor field effect transistor 139 is connected with the sixth node 141, a drain of the metal oxide semiconductor field effect transistor 139 is connected with the seventh node 144, an anode of the fifth diode 143 is connected with the seventh node 144, the anode of the sixth diode 145 is connected with the seventh node 144, and the voltage stabilizing triode 136 is connected with the seventh resistor 138 and the eighth resistor 140 to form an eighth node 148.

What is claimed is:

1. A compound control circuit, connected with a current detection port of a work control chip, the work control chip comparing a first electric signal received by the current detection port with an overcurrent protection level, the compound control circuit comprising:

an input end, connected with a detection point to obtain a second electric signal;

a light-load signal processing circuit, connected with the input end and receiving the second electric signal, the light-load signal processing circuit outputting a third electric signal based on a signal processing mechanism, the signal processing mechanism comprising two signal transition thresholds, and a potential of the third electric signal being determined based on the second electric signal and the two signal transition thresholds, wherein the light-load signal processing circuit comprises a sixth resistor, a fourth capacitor connected in series with the sixth resistor and forming a fifth node, a voltage stabilizing triode, a working voltage source, a seventh resistor connected with the working voltage source and the voltage stabilizing triode, a metal oxide semiconductor field effect transistor, an eighth resistor connected with the voltage stabilizing triode, a ninth resistor connected in series with the eighth resistor and forming a sixth node, a fifth diode connected with the slow response circuit and the fast response circuit, a sixth diode connected with the fifth diode and forming a seventh node, a tenth resistor connected in series with the sixth diode and connected with the fifth node, and an eleventh resistor connected with the working voltage source and the seventh node, a gate of the metal oxide semiconductor field effect transistor is connected with the sixth node, a drain electrode of the metal oxide semiconductor field effect transistor is connected with the seventh node, an anode of the fifth diode is connected with the seventh node, an anode of the sixth diode is connected with the seventh node, and the voltage stabilizing triode is connected with the seventh resistor and the eighth resistor to form an eighth node;

a slow response circuit, receiving the second electric signal and the third electric signal from the input end and the light-load signal processing circuit, the slow response circuit storing energy with the second electric signal and the third electric signal, if the energy stored by the slow response circuit reaches a first response threshold, the first electric signal with a potential corresponding to the overcurrent protection level being provided to the current detection port; and a fast response circuit, receiving the second electric signal and the third electric signal from the input end and the light-load signal processing circuit, and if a potential of the second electric signal and the potential of the third electric signal are accumulated to reach a second response threshold, the fast response circuit quickly providing the first electric signal with the potential corresponding to the overcurrent protection level to the current detection port threshold.

2. The compound control circuit of claim 1, further comprising a first diode connected with the input end, the slow response circuit, and the fast response circuit.

3. The compound control circuit of claim 2, further comprising a first capacitor connected with the slow response circuit, the fast response circuit and the current detection port.

4. The compound control circuit of claim 3, wherein the slow response circuit comprises a second capacitor and a first resistor forming a first node with the second capacitor, the first node is connected with the first diode and the light-load signal processing circuit, the first node receives the second electric signal transmitted by the first diode and the third electric signal output by the light-load signal processing circuit, a negative electrode of the second capacitor is grounded, and one end, which is not connected with the second capacitor, of the first resistor is connected with the current detection port.

5. The compound control circuit of claim 4, wherein the fast response circuit comprises a second resistor, a third resistor connected in series with the second resistor and forming a second node, and a second diode connected with the third resistor, an anode of the second diode is connected with the second node, a cathode is connected with the current detection port, the second resistor is connected with the first diode and the light-load signal processing circuit, and the second resistor receives the second electric signal transmitted by the first diode and the third electric signal output by the light-load signal processing circuit.

6. The compound control circuit of claim 3, wherein the fast response circuit comprises a second resistor, a third resistor connected in series with the second resistor and forming a second node, and a second diode connected with the third resistor, an anode of the second diode is connected with the second node, a cathode is connected with the current detection port, the second resistor is connected with the first diode and the light-load signal processing circuit, and the second resistor receives the second electric signal transmitted by the first diode and the third electric signal output by the light-load signal processing circuit.

7. The compound control circuit of claim 1, wherein the work control chip is an LLC circuit.

\* \* \* \* \*